United States Patent Office 3,396,983
Patented Aug. 13, 1968

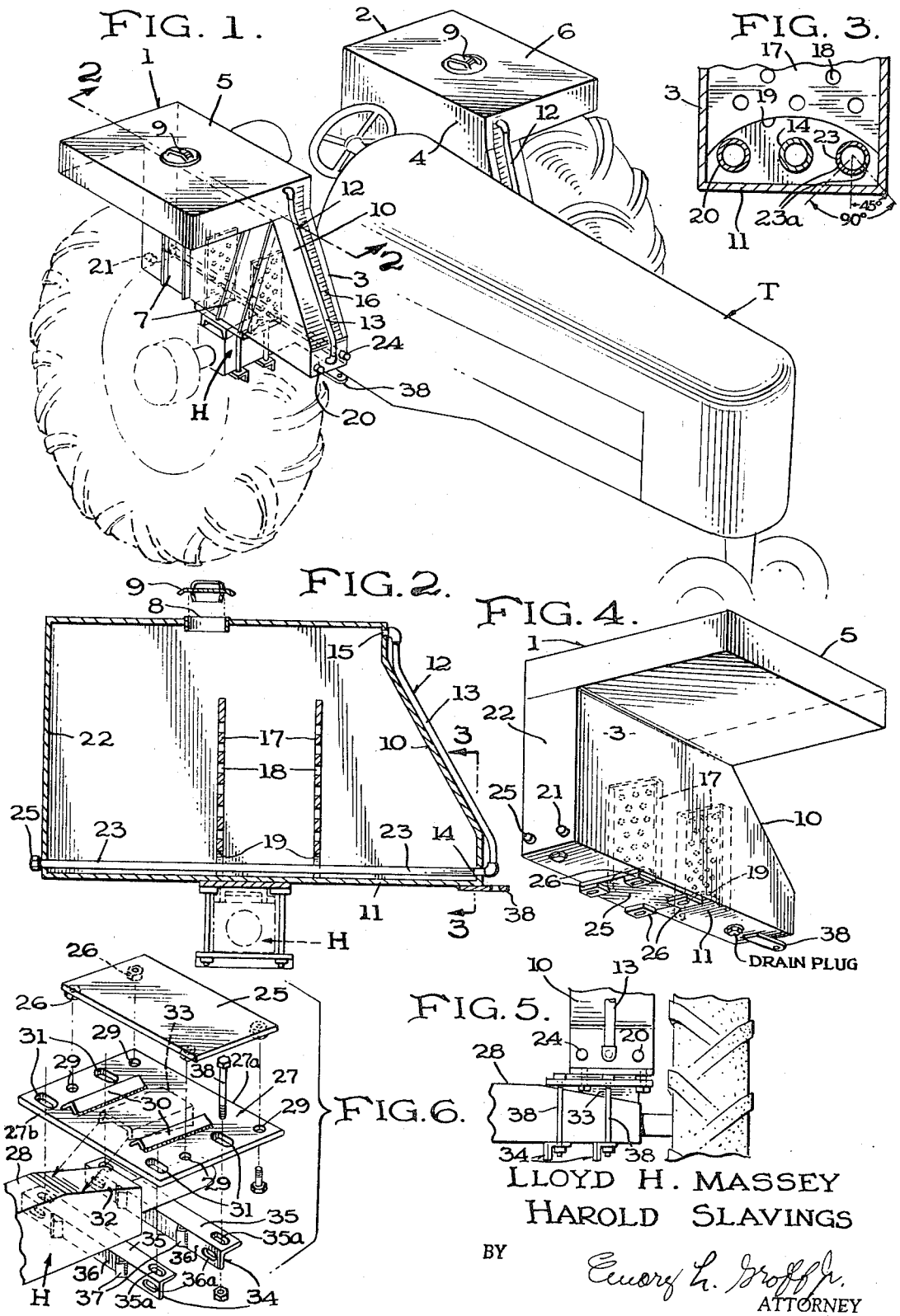

3,396,983
TRACTOR APPARATUS
Lloyd H. Massey and Harold Slavings, both of
Rte. 1, Hayti, Mo. 63851
Filed Nov. 10, 1966, Ser. No. 593,505
5 Claims. (Cl. 280—5)

ABSTRACT OF THE DISCLOSURE

A wheeled vehicle having liquid storage tanks removably attached to the axle housing and serving as fenders shielding one side and the top of the wheels from the vehicle operator. Mounting means for the removable attachment of the tanks includes reversible or selectively positionable members permitting mounting of the tanks upon axle housings of various configurations.

---

This invention relates generally to tractor apparatus, and more particularly, to improved liquid storage tanks which also serve as an integral body portion of the tractor vehicle.

By the present arrangement a unique apparatus is provided, particularly adaptable for use on tractors utilized in the agricultural field wherein liquid storage means are required for conveying and dispensing liquid chemicals such as weed control agents, poison sprays, insecticides. Many liquid storage tank arrangements have been provided in the past for use on tractors, however, the present invention results in an improved construction offering several advantages not heretofore available. As is well known in the art, means are often required in a tractor to increase the traction of the large tires thereof in order to obtain satisfactory operation, particularly when used over cultivated ground, and the most common approach in the past has been to provide cast iron weights attached to the hub of the tractor wheels or to fill the interior of the rear tires with water. These methods have not proved too satisfactory primarily due to the amount of time and labor required to apply and/or remove the weights and/or water.

The present invention overcomes the previous disadvantages by offering a liquid storage and dispensing arrangement which also serves the additional purpose of providing a permanent portion of the tractor body, namely protective structure in the nature of fenders for both rear tires of a tractor.

Liquid storage tanks have long been attached to various portions of tractor bodies; however, most such installations have offered serious disadvantages, the primary ones of which have been the weight distribution and visibility. Tank installations have been provided at the very front of the vehicle, on the sides adjacent the engine compartment, at the rear in the area of the draw-bar, and even mounted above the engine compartment hood. Quite obviously none of these installations would also provide the additional traction feature heretofore described, in view of the center of gravity of the liquid filled tanks, and because of the decreased visibility afforded by these prior known arrangements such tanks must be removed whenever the tractor is not being utilized for the purpose of dispensing the liquid contents of the tanks, particularly in the case where it is impossible to attach any other farm implements to the tractor when these tanks are mounted upon the tractor.

By the present invention, liquid storage and dispensing tanks form an integral part of the tractors and are permanently attached thereto in such a manner as to also provide fenders for the rear tires thereof and offer protection to the driver from contact with both the sides and tops of the two large rear tires. The protection afforded by this safety arrangement is at all times present and whenever additional traction is required it is but a simple matter to provide any desired amount of liquid in the fender tanks which can then be subsequently emptied in a matter of minutes when this ballast is no longer needed.

An additional feature of the present invention is the inclusion of means for maintaining any chemicals used therein in complete suspension whenever the tractor is operated. Heretofore liquid storage tanks on tractors have relied upon the undulating movement of the tractor and tanks during operation thereof to maintain the solution contained therein in a properly agitated condition; however, those well versed in the art are aware that seldom are the chemical mixtures ever properly or sufficiently agitated. This problem will be apparent when one understands that the chemicals most commonly used in tractor sprayers usually comprise a powdered or concentrated liquid that must be mixed with a suitable carrying agent such as water prior to their use. Even though the operator may employ suitable means to agitate the chemical and carrying agent mixture at the time the spraying solution is formulated or the tanks are filled therewith it will be understood that most of the spraying solutions utilized are colloidal suspensions and that the chemical agents therein will begin to settle to the bottom of the spraying tanks as soon as they are filled and the mere agitation imparted to the tanks as the tractor is operated over the fields is insufficient to maintain the homogeneity of the liquid solution throughout its life within the spraying tanks.

Accordingly, one of the primary objects of the present invention is to provide a tractor apparatus comprising liquid storage and dispensing tanks forming a part of the tractor body.

Another object of the present invention is to provide a tractor apparatus including fender tanks mounted over the rear axle thereof and including means therein for automatically agitating liquid contents of the tanks during operation of the tractor.

A further object of the invention is to provide a tractor apparatus including liquid storage and dispensing tanks mounted between the driver and rear wheels of the tractor and extending in overlying relationship above the rear tires thereof.

Still another object of the present invention is to provide a tractor apparatus comprising liquid storage and dispensing tanks including mounting means adapting the tanks for application to tractor axle housings of various configurations.

With these and other objects in view, which will more readily appear as the nature of the invention is better understood, the invention consists in the novel construction and combination of parts hereinafter more fully described, illustrated and claimed.

A preferred and practical embodiment of the invention is shown in the accompanying drawing, in which:

FIGURE 1 is a top perspective view of the tractor apparatus of the present invention.

FIGURE 2 is a vertical sectional view taken along the line 2—2 of FIGURE 1 is one of the fender tanks of the present invention.

FIGURE 3 is a fragmentary vertical sectional view taken along the line 3—3 of FIGURE 2.

FIGURE 4 is a bottom perspective view of one of the fender tanks of the present invention.

FIGURE 5 is a partial front elevational view illustrating the manner of attaching the fender tank of the present invention.

FIGURE 6 is an exploded perspective view of the universal mounting means for the present invention.

Similar reference characters designate corresponding parts throughout the several figures of the drawing.

Referring now to the drawing, particularly FIGURE 1, the present invention will be seen to comprise a pair of fender tank assemblies, generally designated 1 and 2, mounted adjacent and in overlying relationship to the rear tires of a tractor T. The right fender tank assembly 1 and left fender tank assembly 2 are of similar construction, the various components thereof merely being reversed in relation to one another and accordingly, a detailed description of one of said tank assemblies will be sufficient to provide an understanding of both. Each fender tank assembly comprises a side vertical tank section 3 or 4 and an upper horizontal tank section 5 or 6, all of which are formed of box-like construction to provide an interior storage area which is common to both the side and upper sections thereof. Each fender tank assembly may include suitable means to provide additional rigidity thereto such as the channel braces 7 shown in FIGURE 1 of the drawing.

The top of each of the upper tank sections 5 and 6 includes a relatively large filler opening 8 and a suitable filler cap 9 to permit rapid admission of the selected liquid or powder agents to the tank assemblies. The front of each vertical side tank section 4 and 5 comprises a sloping wall 10 which is inclined upwardly from the forward portion of the horizontally disposed flat bottom wall 11 to the bottom front edge of the upper tank section 5 or 6. As will be clearly seen from the drawing the length of the upper tank sections is substantially less than the length of the bottom of the side tank sections. Mounted exterior of the tank assemblies is a sight gauge, generally designated 12, and preferably comprising a transparent glass or plastic tube 13 extending vertically from a point adjacent the bottom of the front sloping wall 10 to a point just below the top of the upper horizontal tank sections 5 and 6. The bottom of the glass tube 13 is provided with a tube inlet 14 communicating with the interior of the tank assemblies juxtaposed the bottom wall 11 thereof while the upper portion of the glass tube 13 communicates with the interior of the tank assembly at a point just below the top wall of the upper tank section thereof. Thus, it will be seen that the liquid content of each of the fender tank assemblies 1 and 2 will be readily apparent upon a quick inspection being made by the tractor operator of the sight gauges 12. Any suitable scale 16 may be fixed to the exterior of the front sloping wall 10 adjacent the sight gauge 12 for the purpose of indicating, such as in gallons, the volume of liquid remaining in the tank assemblies.

In order to retard the shifting or sloshing effect of the liquid contained within the tank assemblies, a pair of baffles 17, each provided with a plurality of apertures 18 are vertically disposed within each of the side vertical tank sections 4 and 5. The baffles 17 include an arcuate cut out portion 19 at the bottom thereof for reasons which will be explained hereinafter.

A spray pump fitting 20 is provided at the bottom of the front sloping walls 10 adjacent the sight tube inlet 14 while a similar pump fitting 21 is located at the bottom of the rear wall 22 of each side vertical tank section. In using the present invention the operator connects the tractor spray pump mechanism (not shown) to either the front pump fitting 20 or the rear pump fitting 21 to draw the fluid from the tank assembly by means of the negative pressure generated by the spray pump mechanism in a conventional manner.

Utilization is made of the spray pump positive bypass pressure to ensure constant and complete agitation of the contents of the tank assemblies. This is accomplished by means of a circulating conduit 23 comprising a hollow pipe extending the entire length of the side tank sections 4 and 5 and disposed a slight distance above the bottom wall 11 thereof. The two ends of the conduit 23 extend through the front wall 10 and rear wall 22 of the tank section and are provided with suitable caps 24 and 25. As will be most clearly seen in the enlarged sectional view of FIGURE 3, the circulating conduit 23 is provided with a plurality of downwardly directed apertures 23a disposed at approximately a 45 degree angle with respect to the bottom wall 11 and extending along both sides of a vertical axis. By attaching the positive pressure line (not shown) to one end of the circulating conduit 23 it will be seen that as the spray system is operated a positive pressure will be continuously delivered to the conduit 23 from where it will issue through the plurality of apertures 23a in a manner specifically calculated to agitate the liquid contents of the tank assemblies by forcefully stirring this liquid at the very point within the tanks wherein sedimentation is most likely to occur. This arrangement produces the maximum colloidal suspension of the spray liquid in a manner far superior to that achieved heretofore wherein the mere agitation of the tanks as a result of the tractor movement was relied upon. This agitation is further enhanced by means of the cut-out portions 19 in each of the baffles 17 which permits ready circulation of the spray liquid longitudinally throughout the side tank sections 4 and 5, which circulation would otherwise be hampered were the baffles 17 to extend to the very bottom of these tank sections.

A primary advantage of this invention is the ease with which the fender tank assemblies 1 and 2 may be readily adapted for secure mounting upon tractors of different manufacturer. The tank assemblies are adapted to be supported by the axle housing H of the tractor T. It is this axle housing that varies in configuration between different tractors, however the present invention enables one to equip this unique fender tank assembly to any tractor with a minimum of labor. By far the majority of tractors are provided with axle housings falling into one of the following three classes: (1) rectangular construction with a flat upper surface; (2) rectangular configuration with a sloping upper surface; and (3) a hexagonal configuration. The bottom wall 11 of each tank assembly is provided with a tank base plate 25 having a pair of threaded nuts 26 welded or otherwise attached to both the forward and rear edges thereof. This base plate 25 is permanently fixed to the bottom wall 11 at a point approximately at the center of gravity of the complete fender tank assembly as computed when the tank assembly is filled with liquid.

The components of the mounting means are most clearly illustrated in the exploded view of FIGURE 6 and are constructed in a manner to permit the mounting of the complete fender tank assembly such as shown in FIGURE 4 to the axle housing H of practically all tractors. This adaptability is possible due to numerous methods of utilizing the various components. To support the tank assembly, the universal mounting plate, generally designated 27, is positioned upon the top surface 28 of the axle housing H. The mounting plate 27 is of a size larger than the base plate 25 attached to the tank and is provided with a plurality of openings 29 spaced to coincide with the location of the threaded nuts 26 on the bottom of the base plate 25, with the outermost pair of openings 29 being located adjacent the outer edge 27a of the plate 27. The top of the mounting plate 27 includes a pair of angle irons 30—30 transversely disposed upon the mounting plate between the forward and rear pairs of openings 29—29 for reasons which will be better understood hereinafter. The height of the angle irons 30—30 is approximately equal to the thickness of the threaded nuts 26 carried by the tank base plate 25 such that when the tank assembly is disposed upon the mounting plate 27 the stability of the base plate 25 resting upon the mounting plate 27 is enhanced.

The mounting plate 27 includes a pair of elongated openings or slots 31 adjacent both the front and rear edges thereof having their longitudinal axes extending the length of the mounting plate and disposed within the plate with the outermost pair thereof adjacent the inner edge 27b of the plate 27. By this arrangement it will be seen that one of the previously described openings 29 will be disposed between each of the two pairs of slots 31. If the axle housing H includes a top surface 28 which is horizontally disposed adjacent the outer end of the axle, then the mounting plate 27 is positioned directly upon this flat top surface 28. If on the other hand, the upper surface of the axle housing H is tapered or inclined downwardly towards the end of the axle as shown at 32 in FIGURE 6, then means must be included for securing the tank base plate 25 to the axle housing in a horizontal manner. This is achieved by utilizing the wedge plate 33 which is likewise tapered or inclined such that when positioned upon the tapered axle housing surface 32 a horizontal upper surface is provided for the reception of the mounting plate 27.

With the mounting plate 27 disposed upon the horizontal surface provided by the wedge plate 33, a pair of hold-down members 34—34 are placed against the under surface of the axle housing as shown in FIGURE 5. Each hold-down member 34 preferably comprises an angle iron, one side 35 of which is provided with elongated holes 35a the position of which is congruent with the similarly elongated holes 31 provided in the mounting plate 27. The other sides 36 of the hold-down members are disposed at right angles to the sides 35 and each includes a pair of transverse angle bars 37, each pair of which are spaced apart a distance corresponding to the distance between the angle bars 30 welded to one side of the mounting plate 27. It will be seen that with the mounting plate 27 disposed in a horizontal plane above the top of the axle housing H that the fender tank assembly may be secured thereto by the application of suitably threaded bolts through the openings 29 of the mounting plate and into the nuts 26 anchored to the under surface of base plate 25. The mounting plate 27 is firmly secured to the axle housing by means of tie bolts 38 disposed through the elongated openings 31 and corresponding openings 35a.

Variation in the width of an axle housing is accounted for by means of the elongation of the openings 31 and 35a. The provision of the pairs of slots 31 in the mounting plate 27 towards the inboard edge 27b of the plate while the openings 29 are disposed towards the outboard edge 27a thereof insures that the mounted tank assembly will be disposed as close to the tractor tires as possible thereby providing the maximum clearance between the side tank sections of the two tank assemblies for the tractor operator.

The foregoing description relates to the mounting of the fender tank assembly of the present invention to tractors having axle housing of rectangular configuration either with a flat top surface 28 extending to the end of the housing or with a tapered top surface 32 at the end of the axle housing. The present universal mounting assembly may be readily adapted to attach the tank assemblies to other axle housings having a hexagonal cross section by the mere reversal of specific components thereof.

In such a case it will be understood that it is only necessary to turn over the mounting plate 27 so that the angle bars 30—30 thereon will face downwardly and thereby straddle the upper inclined portions of a hexaognal axle housing (not shown). At the same time the two hold down members 34—34 are rotated 90 degrees so as to position the sides 36—36 thereof in a horizontal position whereby the attached angle bars 37—37 thereon will abut the downward inclined portions of the hexagonal axle housing. Thereafter the mounting plate 27 is secured as in the first described situation by utilizing the same tie bolts 38 in the elongated holes 36a provided in the side flanges 36a—36a.

The bottom of each fender tank assembly may include a stabilizing bracket 38 at either the forward and/or rear portion thereof to provide additional support means for attachment to the frame or body of the tractor.

We claim:

1. In a vehicle provided with a rear axle housing and a pair of tire-equipped wheels mounted at the ends thereof the combination comprising, a storage tank assembly supported upon each end of said housing, each tank assembly including, a side vertical section extending from said housing upwardly to a point above the top of the adjacent tire and an upper horizontal section projecting outwardly from the vertical section beyond the top of the underlying tire to provide a liquid storage chamber common to both sections, the bottom of each of said side sections provided with a fixed base plate having a plurality of first fastening members secured thereto, adjustable mounting means engaging the top and bottom of said housing below said base plate, second fastening members mating with said first fastening members on said base plate to secure said mounting means to said housing and base plate, and said adjustable mounting means including separate mounting members engageable respectively with the upper and lower surfaces of said housing and each said separate mounting members reversible to present different configurations in engagement with said housing.

2. The combination according to claim 1, wherein said mounting means includes a mounting plate and hold-down members respectively adjacent the top and bottom of said housing and each having a plurality of mating openings, and said second fastening members comprise tie bolts through said openings securing said mounting means to said housing.

3. The combination according to claim 2, wherein the top of said housing is inclined, and wedge means disposed between said mounting plate and inclined housing top maintaining said mounting means horizontally disposed.

4. The combination according to claim 2, wherein said housing is polygonal in section, and said mounting plate and hold-down members are each provided with a pair of transverse angle members in abutment with the adjacent surface of said housing.

5. The combination according to claim 4, wherein said hold-down members each includes two side portions, and said pair of angle members are attached to one of said side portions.

References Cited

UNITED STATES PATENTS

| | | | |
|---|---|---|---|
| 983,346 | 2/1911 | Burdick | 239—74 |
| 1,168,636 | 1/1916 | Hotchkiss | 280—5 |
| 2,181,772 | 11/1939 | Snyder | 280—5 |
| 2,246,866 | 6/1941 | Stribling | 239—127 X |
| 2,509,627 | 5/1950 | Bickerton | 239—74 X |
| 2,583,560 | 1/1952 | Gaddis. | |
| 2,946,598 | 7/1960 | Foster | 280—5 |
| 3,143,295 | 8/1964 | Booker | 239—127 X |

LEO FRIAGLIA, *Primary Examiner.*